May 23, 1972 W. J. ROZMUS 3,664,566
COLD BUTT WELDING MACHINE
Filed April 13, 1970 4 Sheets-Sheet 1

INVENTOR.
Walter J. Rozmus
BY Harness, Dickey & Pierce
ATTORNEYS

INVENTOR.
Walter J. Rozmus
BY
Harness, Dickey & Pierce
ATTORNEYS.

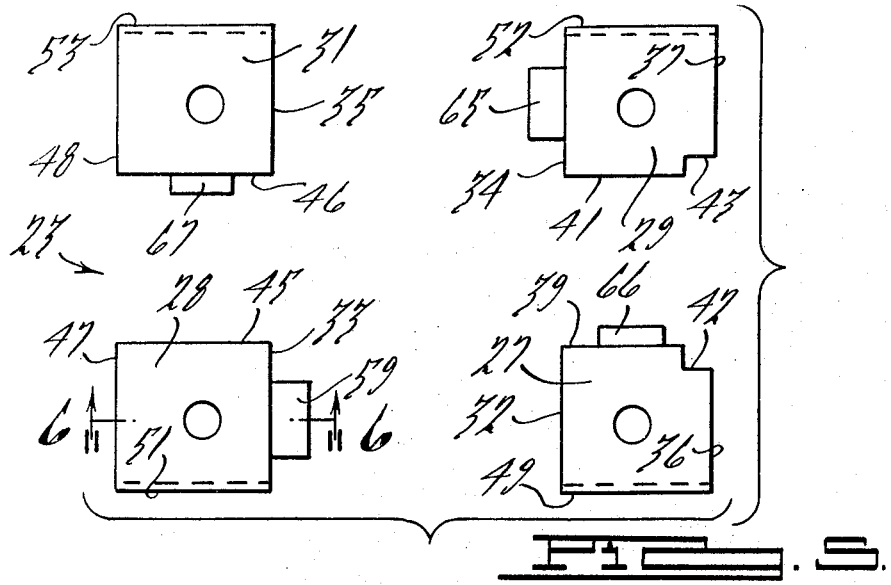
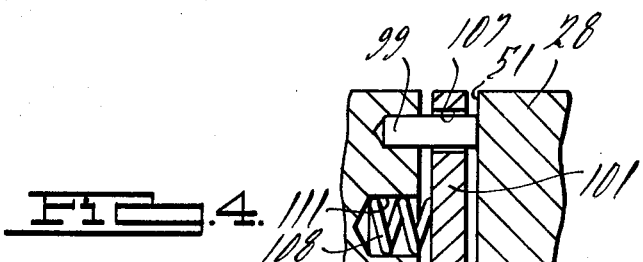
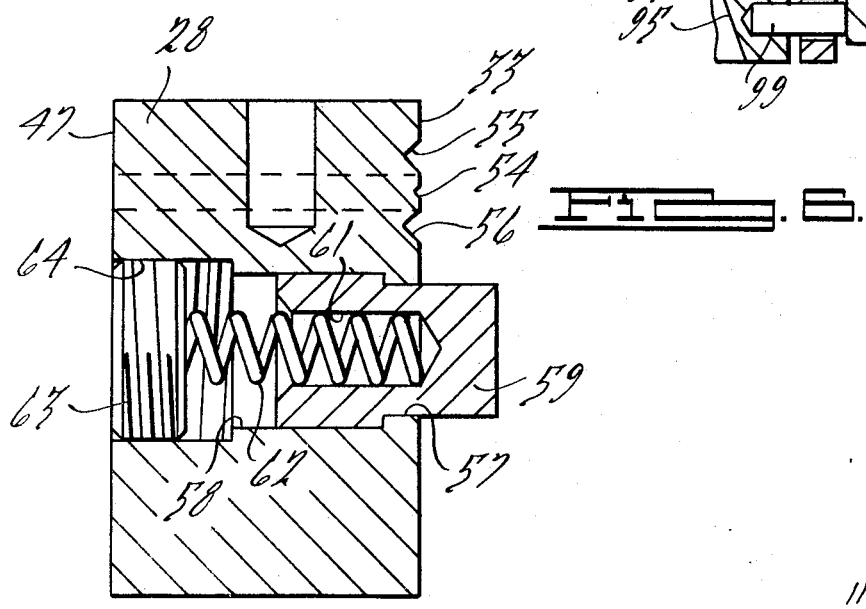

United States Patent Office 3,664,566
Patented May 23, 1972

3,664,566
COLD BUTT WELDING MACHINE
Walter J. Rozmus, Hubbardsville, N.Y., assignor to
Kelsey-Hayes Company
Filed Apr. 13, 1970, Ser. No. 27,591
Int. Cl. B23k 21/00
U.S. Cl. 228—3
14 Claims

ABSTRACT OF THE DISCLOSURE

A cold, multiple upset butt welding machine having a simplified construction. The machine embodies two pairs of dies. One die of each pair is located against a stationary surface of a supporting frame arrangement and the other die of each pair is movable toward and away from the first die between an opened position and a gripping position. A first cam is associated with the other dies of the pairs for moving them between these positions. The pairs of dies are supported for movement toward and away from each other between a spaced position and a welding position. Second cam means are associated with the pair of dies for moving them between their spaced and welding positions. An operating handle has a pivotal connection to each of the cam means and is operative to move the first cam means and bring pairs of dies to their gripping position before the second means is operated and when the dies are in their spaced positions. After a wire is gripped by the closure of the pairs of dies, the second cam means moves the pairs of dies from their spaced positions to their welding positions. This achieves an upset in the wire ends. The procedure is repeated a number of times to achieve a multiple upset.

CROSS REFERENCE TO RELATED APPLICATIONS

This application is related to the copending patent applications of Walter J. Rozmus and Matt T. Rozmus, each entitled "Fine Wire Butt Welder," Ser. Nos. 766,813 and 834,781 filed Oct. 11, 1968 and June 19, 1969, respectively.

BACKGROUND OF THE INVENTION

This invention relates to a cold butt welding machine and more particularly to an improved, simplified, multiple upset cold butt welding machine.

In the aforenoted copending patent applications, there are disclosed machines that are particularly adapted for making multiple upset cold butt welds of fine diameter wires. In each application, two pairs of dies are used for accomplishing this technique. The dies of each pair are movable toward and away from each other between an opened position and a gripping position. The pairs of dies are movable toward and away from each other between a spaced position and a welding position. When the dies are in their gripping position, wire ends are held between each pair of dies and the wire ends are upset as the pairs of dies are moved toward each other from a spaced position to a welding position. In application, Ser. No. 834,781, the importance of moving the dies of the pairs of dies to their gripping positions before the pairs of dies are moved to their welding positions and of moving the dies of the pairs to their opened position before moving the pairs of dies to their spaced position was noted. Primarily their sequence is necessary to insure against the tearing apart of already made weld. In that application, an arrangement was provided that would achieve the desired sequence. Each application embodied V-blocks for moving the dies and application, Ser. No. 834,781, used a spring and blocking arrangement for accomplishing the desired sequence. The use of the V-block actuators has several disadvantages, including adding to the cost of the die set to the necessary tolerance which must be held in the several V-block surfaces, and the structure provided for obtaining the desired sequence of operation is somewhat complicated.

It is, therefore, a principal object of this invention to provide an improved, simplified butt welding machine.

It is another object of the invention to provide a butt welding machine having a simplified drive mechanism for accomplishing the desired sequence of die movement.

It is a further object of the invention to provide a butt welding machine that does not require V-block actuators.

In the machines disclosed in each of the aforenoted copending patent applications, arrangement was provided for facilitating the loading of the ultra-fine wires to be welded. In addition, this loading technique also provided for shearing of the wire ends after loading to accurately locate the wire ends at the faces of the dies. This shearing was effected by means of a first mechanism for depressing one pair of dies and a second mechanism for raising the depressed dies to effect the cutting of the wire ends. This method of loading and cutting the wire ends has proven to be extremely satisfactory. However, the shearing operation requires a somewhat complicated sequence of operations.

It is, therefore, a further object of this invention to provide an improved, simplified structure for loading and cutting the wires to be welded.

It has already been noted that the welding machine disclosed in each of the aforenoted applications embody V-blocks for moving the dies. The use of these V-blocks has made it necessary to provide a high degree of accuracy with respect to several of the die surfaces. In addition, the use of locating pins and keys was required for the dies in those machines.

It is, therefore, a further object of this invention to provide a butt welding machine in which the dies are externally located.

It is another object of the invention to provide a butt welding machine that permits greater accuracy in the die locating function and which is more readily adaptable to handling the welding of wires of various diameters.

SUMMARY OF THE INVENTION

A first feature of this invention is adapted to be embodied in a butt welding machine having first and second pairs of dies. The dies of the pairs are movable toward and away from each other between an opened and a gripping position. The pairs of dies are supported for relative movement toward and away from each other between a spaced position and a welding position. First die operating means movable between a retracted position and a drive position are associated with the dies of the pairs of dies for moving the dies of the pairs relative to each other between their opened positions and their gripping positions. Second die operating means movable between a retracted position and a drive position are associated with the pairs of dies for moving the pairs of dies between their spaced positions and their welding positions. Drive means movable between first and second positions are operatively connected to the first and second die operating means for moving the first die operated means from its retracted position to its drive position while the second die operating means remains in its retracted position and for then moving the second die operating means from its retracted position to its drive position while the first die operating means remains in its drive position.

Another feature of the invention is adapted to be embodied in a wire working machine having two pairs of dies. Each pair of dies defines a respective wire receiving cavity and a surface disposed substantially normally to its respective wire receiving cavity. The respective surfaces of the dies are juxtaposed to each other. The second pair of dies is supported for movement in a direction parallel to its respective surface from a deflected loading position wherein its wire receiving cavity is out of alignment with the wire receiving cavity of the first pair of dies to a shearing position wherein the wire receiving cavity of the second pair of dies is aligned with the wire receiving cavity of the first pair of dies for shearing first and second wires received in the respective cavities of the first and second pair of dies. A single die operating means is provided for moving the second pair of dies from its shearing position to its deflected position and from its deflected position back to its shearing position.

Still another feature of the invention is adapted to be embodied in a wire working machine having at least one pair of dies. The dies have facing surfaces defining wire receiving grooves therein for gripping a wire in said grooves. A supporting frame is provided that has a fixed locating surface that extends substantially parallel to the facing surfaces of the dies. One of the dies has a locating surface engaged with the frame locating surface for holding the one die against movement perpendicular to the locating surface and for locating the one die. Means are provided for moving the other of the dies toward and away from the one die.

BRIEF DESCRIPTION OF THE DRAWING

FIG. 4 is an enlarged cross-sectional view of the area encompassed by the circle 4 of FIG. 3 and taken along a different plane.

FIG. 5 is an exploded top plan view of the die set used in the machine of FIGS. 1 through 4.

FIG. 6 is an enlarged cross-sectional view taken along the line 6—6 of FIG. 5.

DETAILED DESCRIPTION OF THE PREFERRED EMBODIMENT

Figure 1:
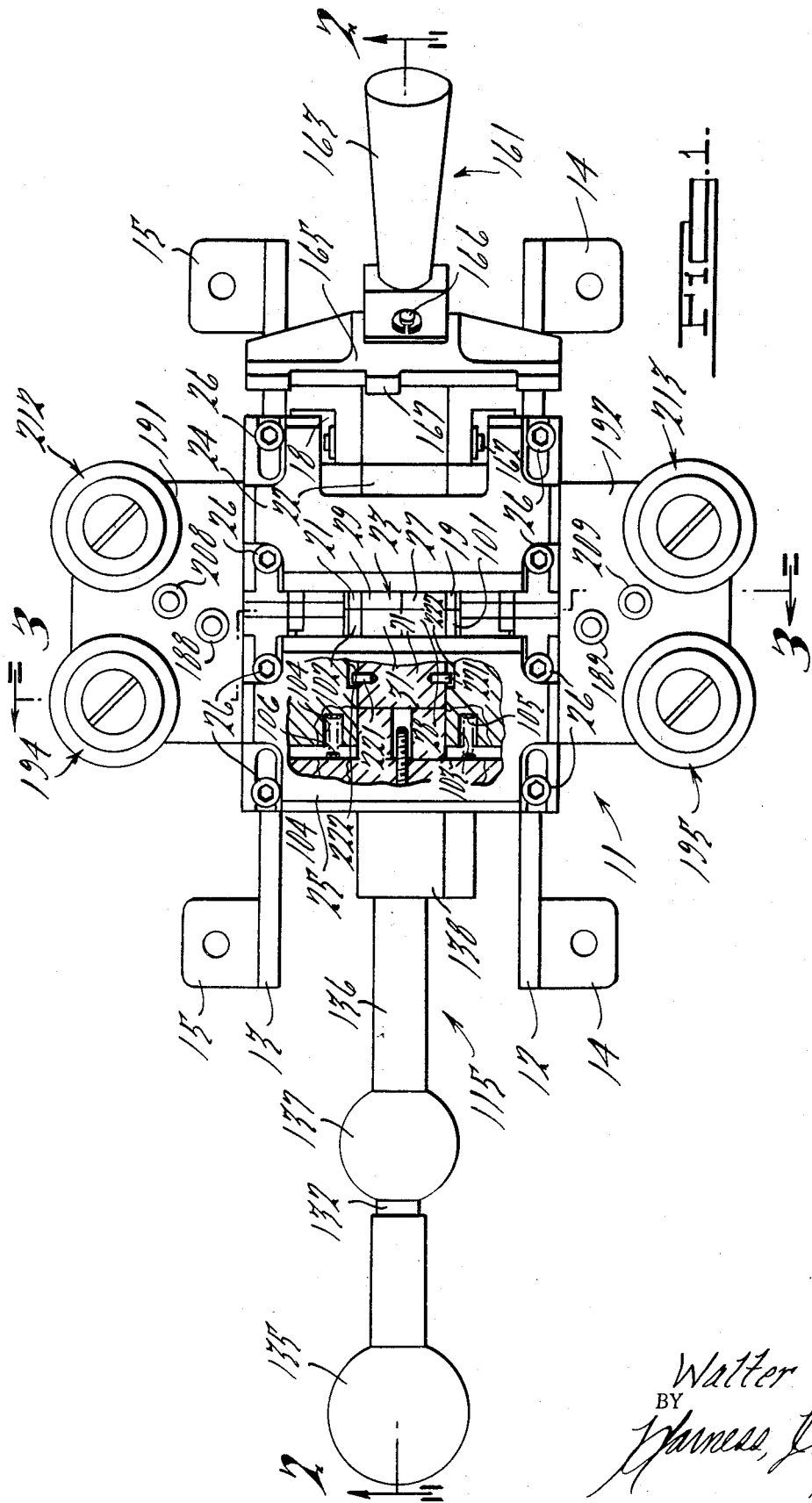
FIG. 1 is a top plan view, with portions broken away, of a multiple upset, cold butt welding machine embodying this invention.

In the drawings, the reference numeral 11 indicates generally a simplified, improved multiple upset cold butt welding machine embodying this invention. The machine 11 is particularly adapted to make multiple upset welds of extremely small diameter wires. It is to be understood, however, that certain of the features of the machine 11 may be used in butt welding machines for welding larger diameter wires, in other types of butt welding machines or in various other types of apparatus.

The machine 11 includes a frame having a pair of spaced apart plates 12 and 13. The plates 12 and 13 have offset portions 14 and 15 at their lower ends which serve as legs or feet for support of the machine 11. A supporting block 16 is positioned between the plates 12 and 13 and the plates are held to this block in any suitable manner, as by means of socket headed screws 17, only one of which appears in the drawings.

A back plate 18 is affixed relative to the plates 12 and 13. Affixed to the back plate 18 and between the side plates 12 and 13 are a pair of stationary gripping fingers 19 and 21 that are disposed on each side of a locating block 22. The locating block 22 and stationary fingers 19 and 21, along with the block 16 and other elements to be described, define a cavity in which a die set assembly, indicated generally by the reference numeral 23 and shown in more detail in FIG. 5, is received. The die set assembly 23 is held within this cavity by means of a pair of cover plates 24 and 25. The cover plates 24 and 25 are affixed to the side plates 12 and 13 by means of socket headed screws 26.

Figure 2:
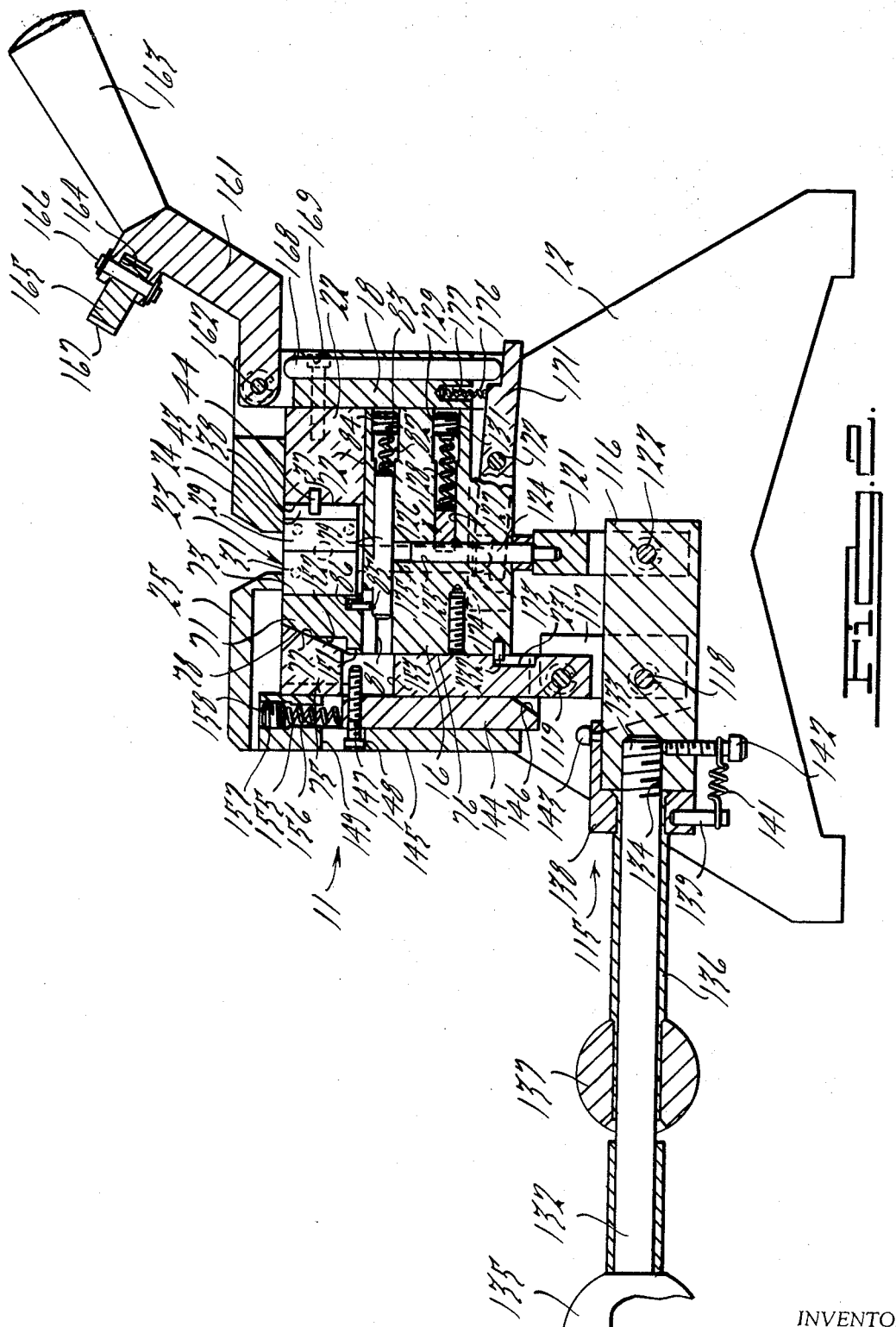
FIG. 2 is a cross-sectional view of the machine shown in FIG. 1 and taken along the line 2—2 thereof.

Referring now to FIGS. 5 and 6, the die set assembly 23 is comprised of a first pair of dies 27 and 28 and a second pair of dies 29 and 31. The first pair of dies 27 and 28 has facing surfaces 32 and 33 in which wire receiving cavities, as will become more apparent as this description proceeds, are formed. In a like manner, the second pair of dies 29, 31 has facing surfaces 34, 35 in which wire receiving cavities are formed. Opposite to their surfaces 32 and 34 and parallel with these surfaces, the dies 27 and 29 have locating surfaces 36 and 37 that are adapted to abuttingly engage a locating surface 38 of the locating block 22 (FIG. 2). The dies 27 and 29 also have facing surfaces 39 and 41. Cut-outs 42 and 43 are formed in the dies 27 and 29 adjacent the junction of their respective surfaces 36, 39 and 37, 41. When the surfaces 39 and 41 are in engagement, the cut-outs 42 and 43 define a keyway in which a key 44 that is affixed to the locating block 22 is received (FIG. 2). The dies 28 and 31 have facing surfaces 45 and 46 and surfaces 47 and 48 that are spaced from and parallel to their surfaces 33 and 35. Surfaces 49, 51, 52 and 53 are formed on the dies 26, 27, 29 and 31 opposite to their respective surfaces 39, 45, 41 and 46.

FIG. 6 is a cross-sectional view of the die 28. As will be noted hereinafter, certain portions of this view are typical for certain portions of the construction of the other dies. The surface 33 of the die 28 is formed with a wire receiving groove 54 that has a shape of the type described in my Pat. No. 3,336,655, issued Aug. 22, 1967 and entitled "Die Structure." On either side of the wire receiving groove 54 a pair of secondary, larger wire receiving grooves 55 and 56 are formed. These other grooves are to assist in the loading and cutoff cycle as described in more detail in the copending patent applications, Ser. Nos. 766,813 and 834,781.

A stepped counterbore having portions 57 and 58 extends through the die 28 from the surface 47 to the surface 33. A stepped plunger 59 is received in this counterbore. The plunger 59 is in turn formed with a drilled bore 61 in which a coil compression spring 62 is inserted. The spring 62 is loaded between the plunger 59 and a set screw 63 that is threaded into a tapped opening 64 formed at the outer end of the bore 58.

It has been noted that FIG. 6 is typical as a cross-sectional view, in certain regards, for each of the dies. The showing of the wire receiving grooves 54, 55 and 56 in the surface 33 of the die 28 is typical for each die. That is, like wire receiving grooves are formed in the surfaces 32, 34 and 35 of the dies 27, 29 and 31, respectively. In this regard, FIG. 6 is a typical showing of such grooves in that cross-sections through the dies 27, 29 and 31 on a plane parallel to the plane of the line 6—6 in FIG. 5 would show such grooves. In a like manner, the plunger 59 and its supporting structure in the die 28 is identical, but a mirror image to the arrangement of a similar plunger 65 in the die 29. Like plungers 66 and 67 are supported in the dies 27 and 31. In these dies, however, the counterbores that support the plungers 66 and 67 extend between the surfaces 39, 49 and 46, 53, respectively.

Figure 3:
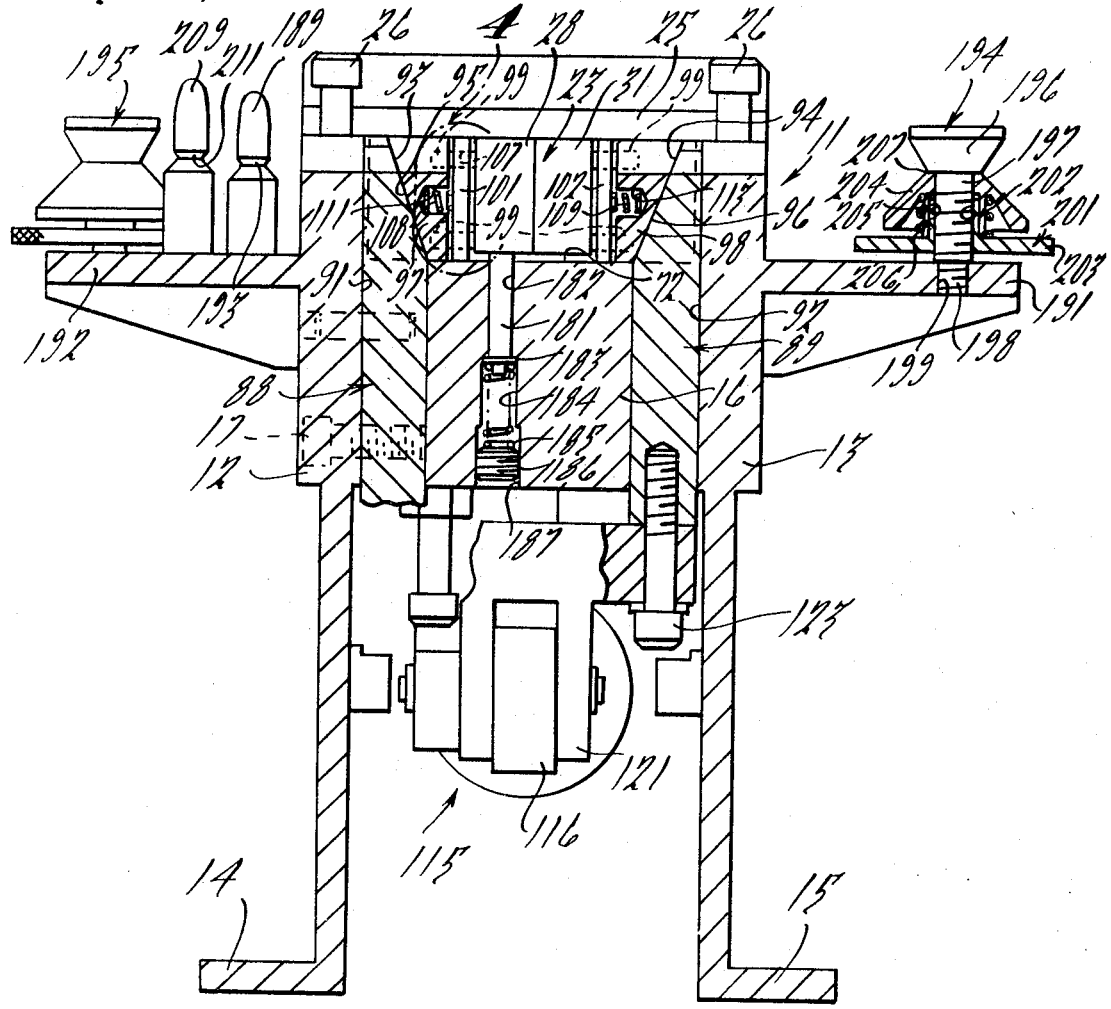
FIG. 3 is a cross-sectional view taken along the line 3—3 of FIG. 1.

Referring now again to the construction of the machine 11 and particularly to FIGS. 1–3, the die set 23 is positioned in the cavity of the base assembly as previously described. A gripping block 71 is supported upon a horizontally disposed surface 72 of the base block 16. The gripping block 71 has a surface 73 that is juxtaposed to and which engages the surfaces 47 and 48 of the dies 28 and 31. The plunger 59 of the die 28 engages the surface 32 of the die 27 for urging the surfaces 33 and 32 of these dies away from each other. At the same time, the surface 47 of the die 28 is urged into engagement with the surface 73 of the gripping block 71 and the surface 36 of the die 27 is urged into engagement with the locating surface 38 of the locating block 22. In a like manner, the plunger 65 of the die 29 engages the surface 35 of the die 31 and urges the dies 29 and 31 apart. Thus, the surface 37 of the die 29 is held against the locating block surface 38 and the surface 48 of the die 31 is urged against the gripping block surface 73.

A first die actuating member in the form of a gripping wedge, indicated generally by the reference numeral 75 is slidably supported in a vertically extending opening 76 formed in part by the block 16 (FIG. 2). The gripping actuating wedge 75 has an inclined surface 77 that is engaged with a complementary surface 78 of the gripping block 71. The surfaces 77 and 78 are held together by the action of the spring biased plungers 59 and 65, and by means of a die opening rod 79 in a manner now to be described. The die opening rod 79 is supported in a bore 81 formed in the block 16. A counterbore 82 is formed at the outer end of the bore 81 and receives a coil spring 83 and a set screw 84. The coil spring 83 is compressed between the set screw 84 and the die opening rod 79 for urging this rod to the left as viewed in FIG. 6. A pin 85 is staked to one end of the rod 79 and extends upwardly into an enlarged counterbore 86 formed in the lower surface of the gripping block 71. The pin 75 transmits the bias of the spring 73 to the gripping block 71.

A second die actuating member in the form of a pair of welding wedges, indicated generally by the reference numerals 88 and 89, are slidably supported in vertically extending cavities 91 and 92 formed between the outer periphery of the block 16 and the adjacent surfaces of the plates 12 and 13 (FIG. 3). The welding wedges 88 and 89 have inclined cam surfaces 93 and 94 that are engaged with complementary surfaces 95 and 96 of welding blocks 97 and 98, respectively. The welding blocks 97 and 98 each carry sets of four spaced pins 99 (FIG. 4). One pair of vertically disposed pins 99 of the welding blocks 97 and 98 engages the surfaces 51 and 49 of the dies 28 and 27, respectively. The other pairs of pins 99 of the welding blocks 97 and 98 engage the surfaces 53 and 52 of the dies 31 and 29, respectively.

The spring biased plungers 66 and 67 of the dies 27 and 31 engage the surfaces 41 and 45 of the dies 29 and 28, respectively, for urging the pair of dies 27, 28 away from the pair of dies 29, 31. This separating force on the pairs of dies also causes the die surfaces 49, 51, 52 and 53 to be urged against the pins 99 and for urging the welding blocks 97 and 98 and specifically their surfaces 95 and 96 against the welding wedge surfaces 93 and 94, respectively.

It has been previously noted that a pair of fixed gripping fingers 19 and 21 are juxtaposed to the dies 27 and 29. A pair of slidably supported gripping members 101 and 102 are juxtaposed to the dies 28 and 31. The gripping members 101 and 102 are formed with bores 103 and 104, respectively, in which coil spring 105 and 106 are received. The springs 105 and 106 urge the grippers 101 and 102 toward the grippers 19 and 21.

Elongated openings 107 are formed in the slidably supported gripping members 101 and 102 to pass one pair of the pins 99. Circular openings are formed in the fixed grippers 19 and 21 (not shown) to pass the other pair of pins 99. A pair of coil springs 108 and 109 are received in pairs of bores 111 and 113 formed in the welding blocks 97 and 98. The springs 108 each bear against one of the grippers 101 and 19 for urging the welding block 97 toward the welding wedge 88. In a like manner, the springs 109 engage the grippers 102 and 19 for urging the welding block 98 against the welding wedge 89.

Referring now to FIGS. 1–3 and primarily to FIG. 2, an operating handle assembly, indicated generally by the reference numeral 115 is supported between the plates 12 and 13 and beneath the block 16. The operating handle assembly 115 includes a generally rectangular plate 116. A pair of links 117 are disposed on opposite sides of the plate 116 and are pivotally connected at their lower ends to the plate 116 by means of a pivot pin 118. The other end of the links 117 are pivotally connected to the gripping wedge 75 by means of a pivot pin 119.

A yoke 121 has spaced apart legs that straddle the plate 116 and which are pivotally connected to this plate by a pivot pin 122. The legs of the yoke 121 are also affixed to the welding wedges 88 and 89, as by bolts 123 (FIG. 3). Between the welding wedges 88 and 89, a vertically extending pin 124 is fixed to the yoke 121. The pin 124 is slidably supported in a bore 125 formed in the block 16. The pin 124 is engaged by a friction block 126 that is supported in a slot 127 in the block 16 which slot intersects the bore 125. A spring 128 is received in the slot 127 and urges the friction block 126 into frictional engagement with the pin 124. The spring 128 is loaded between the block 126 and a set screw 129 that is threaded into a tapped opening 131 formed at the outer end of the slot 127.

An elongated handle member 132 has a threaded end portion 133 that is received in a tapped opening 134 formed in the plate 116. A knob 135 is affixed to the outer end of the handle 132.

A sleeve 136 is slidably supported on the handle 132 and has a knob 137 at its outer end. The other end of the sleeve is staked to a bracket 138. The bracket 138 carries a pin 139 to which one end of a spring 141 is affixed. The other end of the spring 141 encircles a screw 142 that is affixed to the plate 116. The spring 141 normally urges the sleeve 136 and its associated components to its position shown in FIG. 2.

A button 143 is affixed to the inner end of the block 138 and is juxtaposed to a release finger 144. The release finger 144 is slidably supported in the frame assembly between the gripping wedge 75 and an end plate 145 that is fixed in any suitable manner to the frame assembly. The lower end of the release finger 144 has a chamfer, as at 146, for a purpose which will become more apparent as this description proceeds.

At its upper end, the release finger 144 is formed with the tapped opening 147 in which an adjusting screw 148 is received. The adjusting screw 148 is acceessible through one side of the machine 11 by means of a hole 149 formed in the plate 145. The base of the adjusting screw is adapted to engage a shoulder 151 formed on the gripping block 71 and juxtaposed to a cutout 152 in this gripping block. An elongated slot 153 in the gripping wedge 75 clears the adjusting screw 148.

A spring 155 is received in a bore 156 in the plate 145 and bears against the upper end of the release finger 144. The spring 155 is loaded by means of a set screw 157 that is received in a tapped opening 158 formed at the upper end of the bore 156 and which is accessible when the top plate 25 is removed. The spring 155 urges the release finger 144 downwardly until the head of the adjusting screw 148 abuts the end of the opening 149.

A die depressing and cutoff lever 161 is pivotally supported at the upper end of the side plate 18 by means of a pivot pin 162. The lever 161 has an operating handle portion 163 and juxtaposed to this portion is a cutout 164. A die depressing member 165 is supported within the cutout 164 by means of a pin 166. The die depressing member 165 has an offset portion 167 (FIG. 1) that is aligned with the pair of dies 29, 31 for a reason which will become more apparent as this description proceeds.

A cutoff pin 168 is slidably supported in a bore 169 formed in the end plate 18. The upper end of the pin 168 is juxtaposed to the lever 161 and its lower end is juxtaposed to a cutoff lever 171. The cutoff lever 171 is pivotally supported on the frame of the machine by means of a pivot pin 172 and has a notch 173 at its inner end. A plunger rod 174 is slidably supported in a bore 175 in the block 16 and engages the notch 173 in the cutoff lever 171. The upper end of the plunger 174 engages the lower surface of the pair of dies 29, 31.

The cutoff lever 171 is biased in a clockwise direction about its pivot pin 172 by a spring 176 that is received in a bore 177 at the lower end of the plate 18. The bias of the spring 176 acting through the lever 171 urges the plunger 174 and dies 29, 31 upwardly. The dies are thus spring urged into engagement with the plates 24 and 25 so as to locate them. The dies 28 and 27 are also urged upwardly into engagement with the plates 24 and 25. The mechanism for urging these dies upwardly comprises a pair of pins 181, only one of which appears in the drawings (FIG. 3), that are supported in bores 182 in the block 16. The pins 181 have enlarged portions 183 that are received in a counterbore 184 and which are engaged by one end of a respective coil spring 185. The other end of the coil spring 185 bears against a set screw 186 that is threaded into a tapped opening 187 at the base of the counterbore 184.

A loading mechanism is provided, as described in the aforenoted copending patent applications, Ser. Nos. 766,813 and 834,871. This loading mechanism is comprised of a first pair of generally bullet shaped locating members 188 and 189 that are affixed to respective outwardly extending platforms 191 and 192 formed integrally with the plates 13 and 12, respectively. Each of the locating members 188 and 189 is formed with a groove 193, only one of which appears in the drawing in FIG. 3, that are accurately aligned with each other. Holding devices, indicated generally by the reference numerals 194 and 195, are supported upon the platforms 191 and 192 and are juxtaposed to the locating members 188 and 189.

Each of the holding devices 194 and 195 is the same and only the construction of the holding device 194 will be described by particular reference to FIG. 3. The holding device 194 is comprised of a first, generally inverted truncated conical shaped member 196. Depending from this member is a threaded shaft portion 197 that terminates in a reduced diameter threaded portion 198 that is received in a threaded opening 199 in the respective platform. A bushing 201 having a female threaded opening 202 is threaded onto the portion 197 and has an outwardly extending portion 203. A second, truncate conical shaped member 204 has a bore 205 that is slidably supported upon the bushing 201. A coil spring 206 engages the bushing portion 203 and member 204 to urge it upwardly towards the conical shaped member 196 to define a groove 207.

A second pair of bullet shaped locating members 208 and 209 are supported on the platforms 191 and 192 contiguous to the locating members 188 and 189. These locating members also have grooves 211 (FIG. 3). The grooves 211 are aligned with each other and are offset from the grooves 193 at a distance equal to the distance between pairs of the wire receiving grooves 54, 55 or 54, 56 of the die set 23, for a reason which will become more apparent as this description proceeds.

A second pair of wire holding devices, indicated generally by the reference numerals 212 and 213 are juxtaposed to the locating devices 208 and 209. The holding device 212 and 213 are the same in construction as the holding devices 194 and 195. However, the wire receiving grooves defined by the holding devices 212 and 213 are aligned with the grooves 211 of the locating devices 208 and 209.

OPERATION

In the drawings, the die set 23 is shown in a closed, welding position. Assuming that it is desired to insert the ends of two fine wires into the machine 11 for welding, the handle assembly 115 is grasped and the knob 137 and its associated components are slid outwardly against the action of the spring 141. The handle assembly 115 is then drawn upwardly. During initial upward movement of the handle assembly 115 it will pivot about the pivot pin 122 due to the fact that the friction brake shoe 126 acts on the rod 124. This will initially preclude any downward movement of the yoke 121 and determines the initial pivot axis for the handle assembly 115.

When the handle assembly 115 pivots about the pivot pin 122 it will transmit a force through the pivot pin 118 that moves the gripping wedge 75 upwardly. As the gripping wedge 75 moves upwardly, its inclinded surface 77 tends to move away from the inclined surface 78 of the gripping lock 71. The spring bias acting on the block 71 through the dies 28 and 31 and by the spring 83, which action has already been described, will cause the gripping block 71 to retract and the dies 28 and 31 will move away from the dies 27 and 29. This movement continues until the shoulder 151 of the gripping block 71 engages the screw 148.

Upon continued upward movement of the handle assembly 115, the button 143 will engage the release finger 144 and drive it upwardly against the action of the spring 155. When the release finger 144 moves upwardly, the adjusting screw 148 will register with the notch 152 in the gripping block 71 and permit a wider degree on retraction of the dies 28 and 31. This retraction continues until the screw 148 abuts the base of the cutout 152. At this time, the dies 28 and 31 will be sufficiently far apart so as to permit the insertion of a wire between the pairs of dies 27, 28 and 29, 31.

In order to load the machine, the grippers 101 and 102 should also be released. These grippers are released by means of pins 221 that are affixed to and extend outwardly from opposite sides of the gripping block 71. These pins 221 are received in cavities 222 of the movable grippers 101 and 102. When the gripping block 71 is fully retracted, the pins 221 will have traversed the length of the cavities 222 and drawn the grippers 101 and 102 to an opened position against the action of the springs 105 and 106.

Although it would be possible to continue the upward movement of the handle assembly 115 at this time to move the pairs of dies 27, 28 and 29, 31 away from each other, as will become more apparent, this is not necessary for the loading procedure.

Once the pairs of dies 27, 28 and 29, 31 are fully opened, one end of a wire to be joined is trained across the grooves 193 in the locating devices 188 and 189 and is held in place by slipping it into the holding devices 194 and 195. One end of the other wire to be joined is trained across the grooves 211 of the locating devices 208 and 209 and is held by the holding devices 212 and 213. At this time, the wire ends will be disposed one above the other.

When the wire ends are located and held, the die depressing lever 161 is rotated in a counterclockwise direction about the pivot pin 162 as viewed in FIG. 2. This rotation is continued until the die depressing portion 167 engages the upper surface of the pair of dies 29, 31. The rotation is continued slightly until the dies 29, 31 are depressed toward the block surface 72 and until the outer extremities of the die depressing member 165 engage the plates 12 and 13. At this time, the wire receiving grooves 55 of the dies 29 and 31 will be aligned with the wire receiving grooves 54 of the dies 27 and 28 and the wire receiving grooves 56 of the dies 27 and 28 will be aligned with the wire receiving grooves 54 of the dies 29 and 31. At this time, the handle assembly 115 is returned to the position shown in drawings so as to bring the pairs of dies 27, 28 and 29, 31 into gripping engagement with the respective wires. The die depressing and cutoff lever 161 is then rotated in a clockwise direction about the pivot pin 162 as shown in FIG. 2 until it engages the cutoff rod 168 and drives it downwardly. This causes the cutoff lever 171 to rotate in a clockwise direction about the pivot pin 172 and urges the plunger 174 upwardly. This upward movement again brings the pair of dies 29, 31, into alignment with the pairs of dies 27, 28. During this movement the ends of the wires will be sheared by the action of the abutting surfaces 39, 45 and 41, 46 of the dies 27, 28 and 29, 31, respectively. One sheared end of each wire will then be held in the aligned wire receiving grooves 54 of the die set. The other sheared ends will be received in the now unaligned, larger grooves 55 and 56 of the pairs of dies 29, 31 and 27, 28. These wire ends may then be pulled freely from within the dies. The wires are also removed from the holding devices 194, 195, 212 and 213 at this time.

To make the first upset, the handle assembly 115 is again raised. As has been previously noted, the drag of the friction brake shoe 126 on the rod 124 causes the handle assembly to first pivot about the pivot pin 122. This movement urges the gripping wedge 75 upwardly and permits the dies 28 and 31 to move away from the dies 27 and 29. The degree of retraction of these dies is limited by adjustment of the screw 148 which will contact the shoulder 151 of the gripping block 71. The retracted position is such that the wire receiving grooves 54 of the dies 27, 28, 29 and 31 may slide freely relative to the associated wire. The die surfaces 32, 33 and 34, 35 are spaced apart in this opened position a distance less than the diameter of the wire. This will insure that the wire does not become disassociated from the grooves 54.

Pivotal movement of the operating handle assembly 115 about the pivot pin 122 continues until a slot 231 in the gripper wedge 75 (FIG. 2) has traversed a pin 232 in the base block 16. At this time, the gripper wedge 75 cannot move upwardly any further. Continued movement of the operating handle assembly 115 then causes this handle assembly to pivot about the pivot pin 118. When the operating handle assembly 115 has reached the upward limit of its pivotal movement about the pivot pin 122, the button 143 will be disposed within the chamfered area 146 of the release finger 144. Thus, the release finger 144 will not be operated under this condition.

When the handle 115 pivots about the pivot pin 118, the yoke 121 is drawn downwardly. At this time, the welding wedges 88 and 89 move downwardly and the pairs of dies 27, 28 and 29, 31 will move away from each other from their welding positions to a spaced position. The retraction of the pairs of dies 27, 28 and 29, 31 from each other causes no drag on the wires since the wires are no longer gripped by these pairs of dies. Additionally, the wire ends are held against any movement by the grippers 19, 101 and 21, 102.

After the pairs of dies 27, 28 and 29, 31 have been moved to their spaced positions, the handle 115 is again depressed. Again, due to the drag of the friction brake shoe 126 on the rod 124, initial pivotal movement of the handle assembly 115 will occur about the pivot pin 122. During the initial downward movement of the handle assembly 115 pivoting about the pivot pin 122, the gripping wedge 75 is drawn down and forces the dies 28 and 31 of the pairs of dies towards the dies 27 and 29. This movement continues until the die surfaces 32, 33 and 34, 35 are in engagement. The wire ends are then firmly grasped between the dies. At this time, the slot 231 of the gripping wedge 75 will again traverse the pin 232.

Upon continued downward movement of the operating handle assembly 115, pivotal movement will now occur about the pivot pin 118. At this time, the yoke 121 and welding wedges 88 and 89 are driven upwardly. This upward movement causes the pair of dies 27 and 28 to move toward the pair of dies 29 and 31. Since the wire ends are firmly gripped by these pairs of dies, an upset will occur. During the movement of the pairs of dies 27, 28 toward the dies 29, 31 the wire ends will slide through the gripper pairs 19, 101 and 21, 102.

As described in the aforenoted copending applications, this upsetting procedure is repeated several times to insure the making of a good weld through repeated upward and downward movement of the handle assembly 115.

Once a good weld has been made, the knob 137 and sleeve 136 are retracted to that the button 143 will register with the flat on the end of the release shoe 141 to effect opening of the dies in the manner already described. The welded wire can then be removed from the machine 11.

It will be noted that the unique arrangement for causing the pivotal axis of the operating handle assembly 115 to shift is utilized to obtain the desired sequence and movement of the dies. To recapitulate, the dies of the pairs first moved to their gripping positions while the pairs of dies are in their spaced positions. Then the pairs of dies move to their welding positions while the dies of the pairs remain in their gripping postions. The dies of the pairs then move to their opened positions and finally the pairs of dies move to their spaced positions.

The die set 23 is also located by its external surfaces within the machine 11. This reduces the number of surfaces which need be machined and does not require any complicated interrelating structure in the die set to locate the dies one relative to the other. Since the dies 27 and 29 are fixed against movement in a direction perpendicular to the surfaces in which the wire receiving cavities are formed, the center of the associated wire is fixed relative to the machine 11. Thus, in order to use the machine 11 in connection with a different diameter wire, the distance between the surfaces 32, 36 and 34, 37 of the dies 27 and 29 is altered to compensate for the change in wire diameter. The distance between these surfaces is changed in relation to the wire diameter so that the adjacent edge of the wire will be aligned with the stationary wire gripping fingers 19 and 21. Specifically the dies for a larger diameter wire will have a greater distance between the surfaces 32, 36 and 34, 37 than those for a smaller diameter wire. This insures against the exertion of any bending force on the wires when different size wires are used.

What is claimed is:

1. A butt welding machine comprising a first pair of dies, means supporting the dies of said first pair of dies for relative movement toward and away from each other between an opened position and a gripping position, a second pair of dies, means supporting said second pair of dies for relative movement toward and away from each other between an opened position and a gripping position, the dies of said pairs of dies being adapted to hold respective pieces to be welded when said dies are in their gripping positions, said pairs of dies being supported for relative movement toward and away from each other between a spaced position and a welding position, first die operating means movable between a retracted position and a drive position associated with the dies of said pair of dies for moving said pairs of dies relative to each other between their opened positions and their gripping positions, second die operating means for moving said first die operating means from its retracted position to its drive position while said second die operating means remains in its retracted position and for then moving said second die operating means from its retracted position to its drive position while said first die operating means remains in its drive position as said drive means is moved from its first position to its second position.

2. A butt welding machine as set forth in claim 1 wherein the operative connection between the drive means and the first and second die operating means is effective to move the first die operating means from its drive position to its retracted position while the second die operating means is in its drive position and for then moving the second die operating means from its drive position to its retracted position while the first die operating means remains in its retracted position as the drive means is moved from its second position back to its first position.

3. A butt welding machine as set forth in claim 1 wherein the die operating means comprises cams operatively associated with respective dies.

4. A butt welding machine as set forth in claim 1 wherein the first die operating means comprises a first cam supported for sliding movement, the second die operating means comprise at least a second cam supported for sliding movement, and the drive means comprises a lever pivotally connected to said cams at spaced points.

5. A butt welding machine as set forth in claim 4 further including a friction brake operatively associated with the second cam for causing initial pivotal movement of the operating handle to occur about its pivotal connection with the second cam for effecting the noted sequence.

6. A butt welding machine as set forth in claim 5 wherein one die of each pair of dies is held against movement in the direction of relative movement of said pairs of dies between their opened positions and their gripping positions, the first cam being operatively associated with the other dies of said pairs of dies.

7. A butt welding machine as set forth in claim 1 wherein the pairs of dies are spaced apart from each other a distance less than the corresponding dimension of the associated workpiece when the dies are in their opened position, said pairs of dies having cavities formed therein for receiving the workpiece, and further including means for moving said pairs of dies relative to each other from their opened position to a loading position in which a workpiece may be placed between the dies of said pairs of dies and in said cavity.

8. A butt welding machine as set forth in claim 1 wherein one die of each pair of dies is supported against movement in the direction of relative movement of said pairs of dies between their opened positions and their gripping positions, the first die operating means being operatively associated with the other dies of said pairs of dies.

9. A fine wire working machine comprising a first pair of dies, a second pair of dies, said pairs of dies each defining respective wire receiving cavities, said pairs of dies having respective surfaces disposed substantially normally to the respective wire receiving cavities thereof, said respective surfaces of said pairs of dies being juxtaposed to each other, means for supporting said second pair of dies for movement in a direction parallel to its respective surface from a deflected loading position wherein the wire receiving cavity of said second pair of dies is out of alignment with the wire receiving cavity of said first pair of dies to a shearing position wherein said wire receiving cavity of said second pair of dies is aligned with said wire receiving cavity of said first pair of dies for shearing a first wire received in said wire receiving cavity of said first pair of dies and a second wire received in said wire receiving cavity of said second pair of dies and for bringing the sheared ends of the first and second wires into alignment with each other, and a single die operating means for moving said second pair of dies from its shearing position to its deflected position and from its deflected position back to its shearing position.

10. A fine working machine as set forth in claim 9 wherein the single die operating means comprises a single pivotally supported operating lever.

11. A fine wire working machine as set forth in claim 10 wherein the operating lever has a portion adapted to engage the second pair of dies for moving said second pair of dies from its shearing position to its deflected position and further including linkage means operatively connected to said single operating lever and engagable with the side of said second pairs of dies opposite to the side engaged by said lever for moving said dies from their deflected position to their shearing positions.

12. A butt welding machine as set forth in claim 7 further including adjustable stop means for limiting the degree of relative movement of the pairs of dies relative to each other into their opened position, the means for moving said pairs of dies to their loading position including means for moving said adjustable stop means.

13. A butt welding machine as set forth in claim 12 wherein the drive means comprises a lever, and further including stop means for limiting the movement of said lever, said stop means being displaceable for permitting continued movement of said lever beyond its first position, the means for moving the adjustable stop means included means responsive to such movement of said lever beyond its first position.

14. A wire working machine having a first pair of dies, a second pair of dies, said pairs of dies having facing surfaces defining wire receiving grooves therein, and a supporting frame having a fixed locating surface extending parallel to the facing surfaces of said dies, one die of each of said pairs of dies having a locating surface engaged with said frame locating surface for holding said one dies against movement perpendicularly to said frame locating surface and for locating said one dies, each of said dies having resiliently biased means engageable with a surface of another of said dies for urging said dies relatively away from each other, said dies being located relative to each other independently of any interconnecting means between said dies, and means for moving said dies toward each other in opposition to said biasing means.

References Cited
UNITED STATES PATENTS

| | | | |
|---|---|---|---|
| 2,863,344 | 12/1958 | Barnes | 228—3 |
| 3,044,328 | 7/1962 | Zysk | 228—3 |
| 3,093,018 | 6/1963 | Rozmus | 228—3 X |

JOHN F. CAMPBELL, Primary Examiner

R. J. CRAIG, Assistant Examiner

U.S. Cl. X.R.

29—470.1; 228—4

UNITED STATES PATENT OFFICE
CERTIFICATE OF CORRECTION

Patent No. 3,664,566  Dated May 23, 1972

Inventor(s) Walter J. Rozmus

It is certified that error appears in the above-identified patent and that said Letters Patent are hereby corrected as shown below:

Col. 1, line 65, "their" should be --this--.

Col. 3, line 25, "Drawing" should be --Drawings--.

Col. 5, line 18, "75" should be --85--;
       line 31, "engages" should be --engage--.

Col. 7, line 73, "inclinded" should be --inclined--.

Col. 9, line 69, "to" should be --so--.

Col. 10, line 46, after "means" insert --movable between a retracted position and a drive position associated with said pairs of dies for moving said pairs of dies between their spaced positions and their welding positions, and drive means movable between first and second positions operatively connected to said first and second die operating means--.

Signed and sealed this 12th day of December 1972.

(SEAL)
Attest:

EDWARD M. FLETCHER, JR.      ROBERT GOTTSCHALK
Attesting Officer            Commissioner of Patents